(12) United States Patent
Stensland et al.

(10) Patent No.: US 8,970,355 B1
(45) Date of Patent: Mar. 3, 2015

(54) METHODS AND SYSTEMS FOR USE IN INDICATING DIRECTIONS FINDING SYSTEMS

(75) Inventors: Benjamin Alan Stensland, Germantown, MD (US); David Mark McClelland, Germantown, MD (US); Kevin Luke Mace, Germantown, MD (US)

(73) Assignee: HE Boeing Company, Chicago, IL (US)

( * ) Notice: Subject to any disclaimer, the term of this patent is extended or adjusted under 35 U.S.C. 154(b) by 293 days.

(21) Appl. No.: 13/473,997

(22) Filed: May 17, 2012

(51) Int. Cl.
*H04B 3/36* (2006.01)

(52) U.S. Cl.
USPC .......... 340/407.1; 340/573.1; 340/932.2; 434/12; 701/469

(58) Field of Classification Search
USPC .......... 340/407.1, 407.2, 686.1, 573.1, 815.4, 340/935, 425.5, 932.2; 434/12; 701/469; 33/3 A, 3 C
See application file for complete search history.

(56) References Cited

U.S. PATENT DOCUMENTS

| 5,807,111 | A | * | 9/1998 | Schrader | 434/112 |
| 7,788,032 | B2 | | 8/2010 | Moloney | |
| 2008/0120029 | A1 | * | 5/2008 | Zelek et al. | 701/213 |
| 2010/0182134 | A1 | * | 7/2010 | Perkins | 340/407.1 |
| 2010/0201500 | A1 | * | 8/2010 | Stirling et al. | 340/407.1 |
| 2011/0268300 | A1 | * | 11/2011 | Demers et al. | 381/309 |

OTHER PUBLICATIONS

Bains, S.; Mixed Feelings; http://www.wired.com/wired/archive/15.04.esp_pr.html; Mar. 2007; 4 pages.

* cited by examiner

*Primary Examiner* — Brent Swarthout
(74) *Attorney, Agent, or Firm* — Armstrong Teasdale LLP

(57) ABSTRACT

An article is worn by a user. A plurality of indicating devices are coupled to the article. A processing unit is communicatively coupled to the plurality of indicating devices. The processing unit selectively actuates at least one indicating device of the plurality of indicating devices based on positional data.

20 Claims, 2 Drawing Sheets

METHODS AND SYSTEMS FOR USE IN INDICATING DIRECTIONS FINDING SYSTEMS

BACKGROUND

The present disclosure relates generally to direction finding systems and, more particularly, to methods and systems for use in indicating a direction for direction finding systems.

At least some known direction finding systems require users to select their own targets. For example, a user may select a target from a list of detected signals. This approach, however, generally requires a detailed user input interface that enables the user to select the target. Moreover, at least some known direction finding systems include a user display interface that presents a target location to the user. The target location may be overlaid on a map and/or satellite imagery to enable the user to navigate and/to traverse an area. However, the user may not be in an environment and/or situation where visual presentation of the target location is appropriate and/or the best option.

BRIEF SUMMARY

In one aspect, a method is provided for use in indicating a direction. The method includes coupling a plurality of indicating devices to an article configured to be worn by a user. At least one indicating device of the plurality of indicating devices is selectively actuated based on positional data.

In another aspect, a computing system is provided for use in indicating a direction. The computing system includes a processor, and a computer-readable storage device having encoded thereon computer readable instructions that are executable by the processor to perform functions including selectively actuating at least one indicating device of the plurality of indicating devices based on positional data.

In yet another aspect, a system is provided for use in selecting a target. The system includes an article configured to be worn by a user, a plurality of indicating devices coupled to the article, and a processing unit communicatively coupled to the plurality of indicating devices. The processing unit is programmed to selectively actuate at least one indicating device of the plurality of indicating devices based on positional data.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The present disclosure relates generally to direction finding systems and, more particularly, to methods and systems for use in indicating a direction using direction finding systems. In one embodiment, an article is worn by a user. A plurality of indicating devices are coupled to the article. A processing unit communicatively coupled to the indicating devices selectively actuates at least one indicating device based on positional data. In such an embodiment, the indicating devices provide non-visual (e.g., tactile and/or auditory) stimuli to the user to facilitate directing the user in a predetermined direction. Embodiments of the methods and systems described herein enable a computing system to (i) receive a first signal associated with a first user device, (ii) receive a second signal associated with a second user device, (iii) identify the first user device as an active target based on a predefined rule set including a plurality of selection criteria, and (iv) identify the second user device as an active tracking device based on the predefined rule set.

The methods and systems described herein may be implemented using computer programming or engineering techniques including computer software, firmware, hardware or any combination or subset thereof, wherein the technical effects may include at least one of a) determining an orientation of a user, b) determining a relative position for each indicating device of a plurality of indicating devices, c) selectively actuating at least one indicating device based on positional data, d) independently actuating each indicating device based on the positional data, e) actuating the plurality of indicating devices in a predetermined pattern based on the positional data, wherein the predetermined pattern is indicative of at least one of a line of bearing towards a target, a cone of uncertainty, and a range of the target.

As used herein, an element or step recited in the singular and proceeded with the word "a" or "an" should be understood as not excluding plural elements or steps unless such exclusion is explicitly recited. Moreover, references to "one embodiment" and/or the "exemplary embodiment" are not intended to be interpreted as excluding the existence of additional embodiments that also incorporate the recited features.

Figure 1:
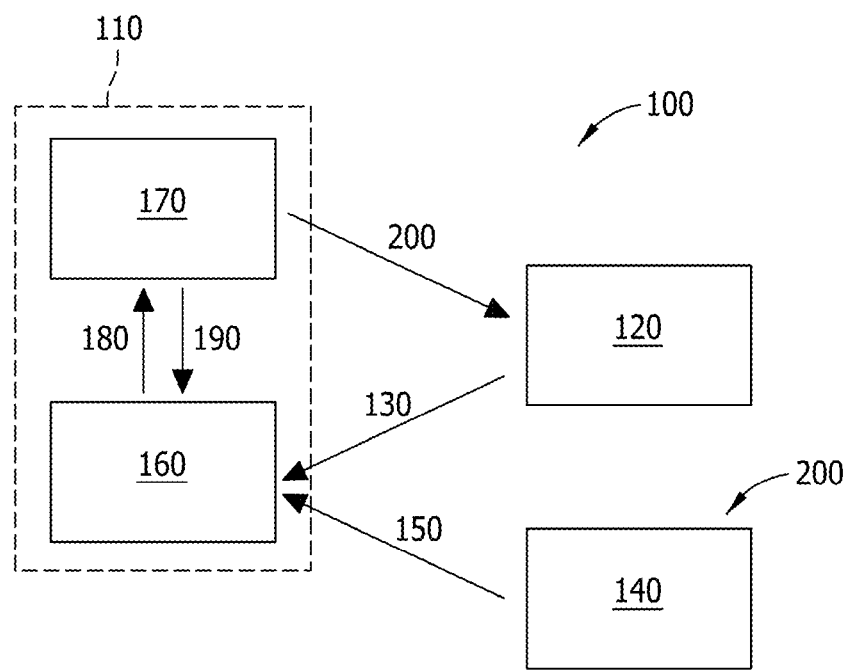
FIG. 1 is a schematic illustration of an exemplary direction finding system.

FIG. 1 is a schematic illustration of an exemplary direction finding (DF) system 100. In the exemplary embodiment, DF system 100 includes a control system 110, at least one first user device 120 configured to transmit a first signal 130, and at least one second user device 140 configured to transmit a second signal 150. In the exemplary embodiment, first user device 120 is a transmitter, and second user device 140 is a transceiver. Alternatively, a user device may be configured to transmit and/or receive any signal that enables DF system 100 to function as described herein. As used herein, "user device" should be understood generally as a device capable of at least transmitting a signal. For example, user device may be embodied as or within a land vehicle, airborne vehicle, space vehicle, oceanic vehicle, marine vehicle, unmanned robotic vehicle, hand-held device, deployable device, an article worn by a user, and the like. Additionally or alternatively, in at least some embodiments, user device may be embodied as part of or attached to buildings, bridges, roads, landmarks, or other structures.

In the exemplary embodiment, the reception and/or perception of first signal 130 and second signal 150 enables a first user device location and a second user device location to be determined, respectively. More particularly, in the exemplary embodiment, control system 110 includes a direction finding (DF) device 160 at a DF device location, and a control module 170 at a home location. In at least some embodiments, the DF device location is remote from the home location. An accuracy of DF device 160 and/or control module 170 does not decrease as distance increases between the DF device location and the home location. That is, DF device 160 may be positioned at any distance from control module 170 that enables DF system 100. In the exemplary embodiment, DF device 160 is configured to detect and/or receive a beacon signal, and control module 170 is configured to detect and/or receive a "content-rich" signal. Moreover, in at least some embodiments, DF device 160 may be configured to receive content-rich signals and/or a beacon signal, and transmit or deliver the content-rich signal to control module 170. That is, DF device 160 may be configured to receive a beacon signal or a content-rich signal. Or, DF device 160 may be configured to receive both a beacon signal and a content rich signal. Additionally or alternatively, a content-rich signal may be a beacon signal if its content is not used by the devices.

As used herein, "beacon signal" should be understood as a signal where information associated with and/or obtained from the signal is based on a reception and/or perception of the signal itself and not its contents. For example, the first user device location may be determined based on a received signal strength (RSS) and/or an angle of arrival (AoA). Moreover, as used herein, "content-rich signal" should be understood as a signal where information associated with and/or obtained from the signal is based at least in part on the contents of the signal. For example, in addition to RSS and AoA, the second user device location may be determined based at least in part on global positioning system (GPS) information that is coded within the signal. Alternatively, first signal 130 and/or second signal 150 may be any type of signal that enables DF system 100 to function as described herein.

In the exemplary embodiment, DF device 160 is configured to receive first signal 130 and/or second signal 150 and transmit a DF device signal 180 to control module 170 in response to receiving first signal 130 and/or second signal 150. That is, in the exemplary embodiment, DF device signal 180 is associated with first signal 130 and/or second signal 150. Additionally or alternatively, control module 170 may be configured to receive a content-rich first signal 130 and/or second signal 150 directly from first user device 120 and/or second user device 140, respectively. In the exemplary embodiment, control system 110 is configured to activate upon receiving first signal 130 and/or second signal 150. That is, in the exemplary embodiment, control system 110 remains in a sleep, suspended, and/or standby state until first signal 130 and/or second signal 150 is received, detected, or otherwise determined that first signal 130 and/or second signal 150 has been transmitted. Alternatively, control system 110 may be activated and/or be functioning any time that enables DF system 100 to function as described herein.

In the exemplary embodiment, control module 170 is configured to determine and/or identify first user device 120 and/or second user device 140 as an active target and/or an active tracking device based on a predefined rule set including a plurality of selection criteria. That is, a user device may be determined and/or identified as being an active target or an active tracking device. Or, a user device may be determined and/or identified as being both an active target and an active tracking device based on a predefined rule set. Without limitation, as an example of a rule, a user device may be identified as an active target or active tracking device if a received signal matches a pre-defined signal signature to a particular criteria. It is appreciated one skilled in the art may develop any number of rules using one or more selection criteria suitable for the application of the direction finding system. The selection criteria may include, without limitation, an RSS of first signal 130 and/or second signal 150, an AoA of first signal 130 and/or second signal 150, a location of first user device 120 and/or second user device 140, an orientation of first user device 120 and/or second user device 140, a motion of first user device 120 and/or second user device 140, a state or condition of first user device 120 and/or second user device 140, and/or a priority of first user device 120 and/or second user device 140. The state or condition of the user device may be any state including an active state, a sleep state, a target state, a tracking device state, a standard state, and/or an emergency state. Alternatively, the predefined rule set may include any selection criterion that enables control module 170 to function as described herein.

For example, in the exemplary embodiment, first user device 120 is identified as an active target, and second user device 140 is identified an active tracking device. Identifying the first user device as the active target may be based on at least one of a signal strength of the first signal, an angle of arrival of the first signal, a location of the first device, an orientation of the first device, a motion of the first device, a condition of the first device, and a priority of the first device. In addition or alternatively, identification of the first device as the active target may be based on an active tracking device (second user device 140). For example, identifying the first device as the active target based on at least one of a signal strength of the second signal, an angle of arrival of the second signal, a location of the second device, an orientation of the second device, a motion of the second device, a condition of the second device, and a priority of the second device. In a similar manner, identifying the second device as an active tracking device may be based on selection criteria previously described or a state or condition of the second device and/or the first device. In at least some embodiments, an active target may become an active tracking device. Conversely, in at least some embodiments, an active tracking device may become an active target. First user device 120 and/or second user device 140 may be identified as any type of device that enables DF system 100 to function as described herein.

In the exemplary embodiment, control module 170 is programmed to determine positional data associated with an active target based on first signal 130, second signal 150, and/or at least one DF device signal 180. For example, in at least some embodiments, control module 170 determines an absolute geographic location (e.g., GPS information) of first user device 120 and/or second user device 140 based on the first signal 130 and/or the second signal 150, respectively. Additionally or alternatively, in at least some embodiments, control module 170 determines a relative spatial location of first user device 120 and/or second user device 140 based on the first signal 130 and the second signal 150. In at least some embodiments, the relative spatial location may be determined without identifying and/or determining an absolute geographic location of the devices. For example, triangulation and/or trilateration may be used to determine the location of any device a point by measuring angles and/or distances. In at least some embodiments, a plurality of DF devices 160 may be used to facilitate determining locations and/or directions via triangulation and/or trilateration. Positional data, as used herein, may refer to an orientation of any device, a position of any device, a direction or angle towards any device, and/or a range, distance, or proximity to any device.

In the exemplary embodiment, control module 170 is programmed to determine operational data for DF device 160 based on the positional data. In the exemplary embodiment, control module 170 transmits operational data 190 to DF device 160 to facilitate increasing the quality of first signal 130, second signal 150, and/or DF device signal 180. For example, in at least some embodiments, operational data 190 may include instructions to selectively adjust a tuner included in DF device 160 and/or selectively rotate DF device 160 about a vertical axis. Alternatively, DF device 160 may be rotated about any axis that enables DF device 160 to function as described herein.

In the exemplary embodiment, control module 170 is configured to transmit the positional data 200 associated with the target location of an active target (e.g., first user device 120) to an active tracking device (e.g., second user device 140). For example, in at least some embodiments, control module 170 determines directions for use in locating the first user device location, and transmits the directions to second user device 140. In such embodiments, positional data 200 may facilitate instructing the user of active tracking device 140 to, for example, "go north ten feet" (i.e., relative location-based directions) and/or "go to the following coordinates" (i.e., absolute location-based directions).

In at least some embodiments, additional user devices (not shown) may be identified as an active target and/or an active tracking device based on the predefined rule set. For example, in one embodiment, a third user device is identified as an active tracking device, and control module 170 transmits data associated with the target location to the third user device such that second user device 140 and the third user device have a common target (i.e., first user device 120).

In another embodiment, a third user device is identified as an active target, a fourth user device is identified as an active tracking device, and control module 170 transmits data associated with the target location of a first active target (e.g., first user device 120) to a first active tracking device (e.g., second user device 140), and transmits data associated with the target location of a second active target (e.g., the third user device) to a second active tracking device (e.g., the fourth user device). Any number of tracking devices may be associated with each target, and any number of targets may be associated with each tracking device. For example, multiple tracking devices may locate a common target, and a single tracking device may locate multiple targets.

Figure 2:
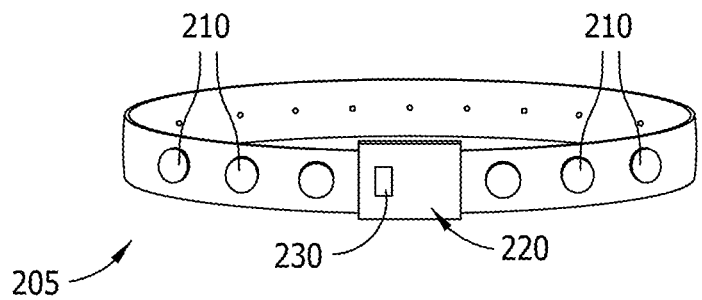
FIG. 2 is a schematic illustration of an exemplary article that may be used with the direction finding system shown in FIG. 1.

FIG. 2 is a schematic illustration of an exemplary article 205 that may be worn by a user. In the exemplary embodiment, article 205 may be used as first user device 120 and/or second user device 140. Article 205 may be any article of clothing that enables article 205 to function as described herein. For example, article 205 may include any combination of belts, necklaces, headbands, suspenders, arm bands, bracelets, anklets, and/or braces.

In the exemplary embodiment, article 205 is coupled to a plurality of indicating devices 210, a processing unit 220 coupled to indicating devices 210, and a portable power source 230. In the exemplary embodiment, indicating devices 210 are configured to provide non-visual (e.g., tactile and/or auditory) stimuli to the user. For example, in the exemplary embodiment, indicating devices 210 are motor-vibrators (e.g., electric motors with spinning weights) and/or may be fabricated at least partially from a piezoelectric material. Alternatively, indicating devices 210 may be fabricated from any materials that enable indicating devices 210 to function as described herein.

In the exemplary embodiment, processing unit 220 is programmed to selectively actuate at least one indicating device 210 for a predetermined duration and/or at a predetermined intensity based on positional data. More particularly, in the exemplary embodiment, processing unit 220 is programmed and/or configured to receive positional data from control system 110 or, more particularly, control module 170. For example, in at least some embodiments, processing unit 220 independently actuates each indicating device 210 based on the positional data to present positional data to the user.

In one embodiment, indicating devices 210 are actuated in a predetermined pattern based on the positional data. The predetermined pattern may be indicative of a line of bearing towards an active target and/or a cone of uncertainty. As used herein, "line of bearing" should be understood as a signal and/or pattern that indicates a precise direction towards a target location. Moreover, as used herein, "cone of uncertainty" should be understood as a signal and/or pattern that generally indicates an uncertainty of a target location. The uncertainty may have any degree of confidence that enables article 205 and/or indicating devices 210 to function as described herein. For example, in at least some embodiments, the cone of uncertainty may span in any direction in three-dimensional space when there is no certainty of a target location, and the cone of uncertainty may indicate a general direction towards a target location when there is at least some certainty of a target location. In at least some embodiments, the predetermined pattern may have the highest magnitude in the center (i.e., towards the target location) and decreasing magnitude in a radial progression, have a limited number of adjacent devices commanded at higher magnitude, and/or have a greater number of adjacent devices commanded at a lower magnitude.

Moreover, in the exemplary embodiment, the predetermined pattern may be indicative of a range of and/or a distance to the target location. For example, in at least some embodiments, indicating devices 210 may be actuated more frequently as article 205 and/or indicating devices 210 are moved closer to the target location. Conversely, in at least some embodiments, indicating devices 210 may be actuated less frequently as article 205 and/or indicating devices 210 are moved closer to the target location. Indicating devices 210 may be actuated in any pattern that enables DF system 100 to function as described herein.

In the exemplary embodiment, indicating devices 210 may be arranged to indicate any direction in three-dimensional space. In at least some embodiments, processing unit 220 determines a relative position for each indicating device 210 to facilitate determining which indicating device 210 to selectively actuate and/or in which pattern to selectively actuate indicating devices 210. Alternatively, indicating devices 210 may be positioned in a plurality of predetermined locations on article 205. Moreover, in the exemplary embodiment, processing unit 220 is programmed to determine an orientation of the user, and selectively actuate indicating devices 210 based on positional data and/or the orientation of the user. For example, in at least some embodiments, orientation may refer to one or more of a sensed relative orientation of a user, body orientation relative to a horizontal or vertical axis, direction a user is facing, and whether a user is standing, sitting, crouching, crawling, or lying down. Additionally or alternatively, in the exemplary embodiment, processing unit 220 is programmed to transmit data to DF device 160 and/or control module 170 to facilitate determining the orientation of the user.

Figure 3:
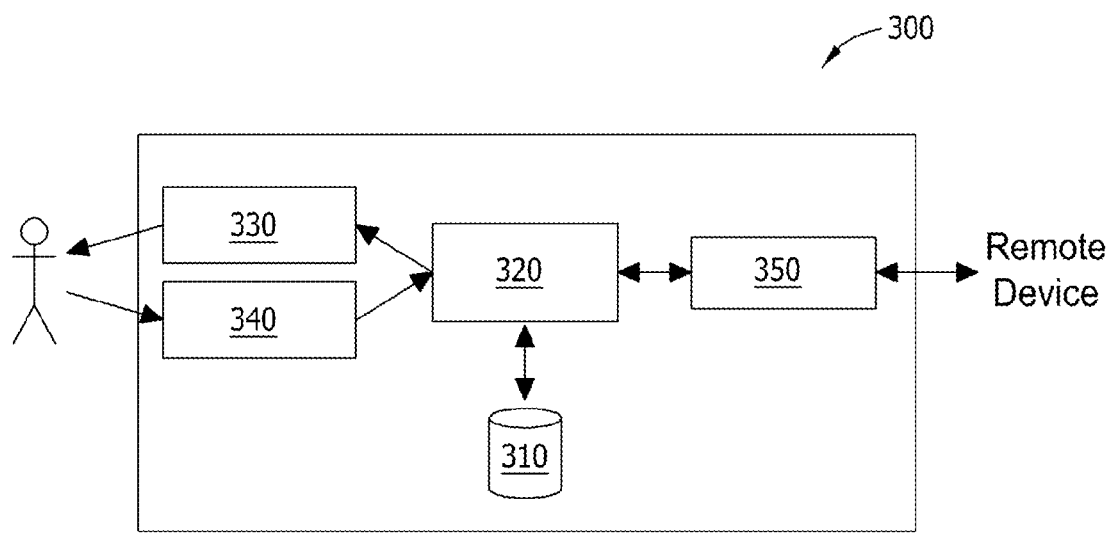
FIG. 3 is a schematic illustration of an exemplary computing system that may be used with the direction finding system shown in FIG. 1 and/or the user device shown in FIG. 2.

FIG. 3 is a schematic illustration of an exemplary computing system 300 that may be used with and/or within control system 110, first user device 120, second user device 140, DF device 160, control module 170, and/or processing unit 220. In the exemplary embodiment, computing system 300 includes a memory device 310 and a processor 320 coupled to memory device 310 for use in executing instructions. More specifically, in the exemplary embodiment, computing system 300 is configurable to perform one or more operations described herein by programming memory device 310 and/or processor 320. For example, processor 320 may be programmed by encoding an operation as one or more executable instructions and by providing the executable instructions in memory device 310.

Processor 320 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits.

In the exemplary embodiment, memory device 310 includes one or more devices (not shown) that enable information such as executable instructions and/or other data to be selectively stored and retrieved. In the exemplary embodiment, such data may include, but is not limited to, positional data, directional data, GPS data, map data, blueprint data, floor plan data, operational data, and/or control algorithms. Alternatively, computing system 300 may be configured to use any algorithm and/or method that enable the methods and systems to function as described herein. Memory device 310 may also include one or more computer readable media, such as, without limitation, dynamic random access memory (DRAM), static random access memory (SRAM), a solid state disk, and/or a hard disk.

In the exemplary embodiment, computing system 300 includes a presentation interface 330 that is coupled to processor 320 for use in presenting information to a user. For example, presentation interface 330 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display, and/or a printer. In some embodiments, presentation interface 330 includes one or more display devices.

Computing system 300, in the exemplary embodiment, includes an input interface 340 for receiving input from the user. For example, in the exemplary embodiment, input interface 340 receives information suitable for use with the methods described herein. Input interface 340 is coupled to processor 320 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 330 and as input interface 340.

In the exemplary embodiment, computing system 300 includes a communication interface 350 that is coupled to processor 320. In the exemplary embodiment, communication interface 350 communicates with at least one remote device, such as control system 110, first user device 120, second user device 140, DF device 160, control module 170, and/or processing unit 220. For example, communication interface 350 may use, without limitation, a wired network adapter, a wireless network adapter, and/or a mobile telecommunications adapter. A network (not shown) used to couple computing system 300 to the remote device may include, without limitation, the Internet, a local area network (LAN), a wide area network (WAN), a wireless LAN (WLAN), a mesh network, and/or a virtual private network (VPN) or other suitable communication means.

Figure 4:
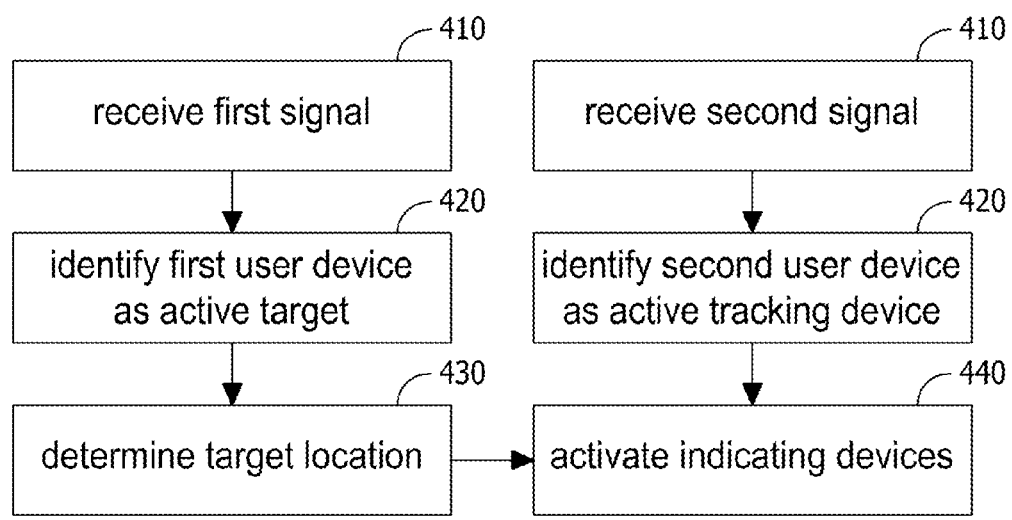
FIG. 4 is a flowchart of an exemplary method that may be implemented by the computing system shown in FIG. 3.

FIG. 4 is a flowchart of an exemplary method 400 that may be implemented to select a target, indicate a direction, and/or track a target. During operation, control system 110 is activated upon receiving 410 first signal 130 from first user device 120, and/or a second signal 150 from second user device 140. Based on a predefined rule set, in the exemplary embodiment, control system 110 identifies 420 first user device 120 and/or second user device 140 as an active target and/or an active tracking device. More particularly, in the exemplary embodiment, first user device 120 is identified 420 as an active target, and second user device 140 is identified 420 as an active tracking device. Alternatively, first user device 120 and/or second user device 140 may be identified as any type of device based on the predefined rule set that enables DF system 100 to function as described herein.

In the exemplary embodiment, control system 110 determines 430 a target location associated with first user device 120, and transmits data associated with the target location to second user device 140 and/or to any other active tracking devices identified by control system 110. More particularly, in the exemplary embodiment, control module 170 transmits positional data to processing unit 220, and processing unit 220 selectively actuates 440 indicating devices 210 based on the positional data to facilitate directing the user towards the target location. In at least some embodiments, control system 110 may transmit data associated with a plurality of target locations to a plurality of active tracking device such that each tracking device is configured to track a respective active target.

The embodiments described herein relate generally to direction finding systems and, more particularly, to methods and systems for use in indicating a direction for direction finding systems. The embodiments described herein enable a user to navigate and/or traverse an area based on a tactile signal, an auditory signal, and/or any other non-visual signal.

Exemplary embodiments of methods and systems for direction finding systems are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for indicating a direction, said method comprising:
coupling a plurality of indicating devices to an article configured to be worn by a user;
coupling a processor to the plurality of indicating devices;
configuring the processor to:
receive positional data from a control system that is remote from the user;
selectively actuate at least one indicating device of the plurality of indicating devices based on the positional data, including actuating the plurality of indicating devices in a predetermined pattern indicative of a cone of uncertainty associated with a degree of uncertainty of a target location; and transmit orientation data to the control system.

2. A method in accordance with claim 1, further comprising configuring the processor to independently actuate each indicating device of the plurality of indicating devices based on the positional data.

3. A method in accordance with claim 1, further comprising configuring the processor to actuate the plurality of indicating devices in the predetermined pattern based on the positional data, the predetermined pattern further indicative of at least one of a line of bearing towards the target location and a range of the target location.

4. A method in accordance with claim 1, further comprising configuring the processor to generate at least one of a tactile signal and an auditory signal using at least one of the plurality of indicating devices.

5. A method in accordance with claim 1 further comprising configuring the processor to determine an orientation of the user.

6. A method in accordance with claim 1 further comprising configuring the processor to determine a relative position for each indicating device of the plurality of indicating devices.

7. A method in accordance with claim 1, wherein coupling the plurality of indicating devices further comprises positioning the plurality of indicating devices in a plurality of predetermined locations.

8. A computing system for indicating a direction, said computing system comprising:
  a processor; and
  a computer-readable storage device having encoded thereon computer readable instructions that are executable by the processor to perform functions comprising:
    receiving positional data from a control system that is remote from a user of the computing system;
    selectively actuating at least one indicating device of the plurality of indicating devices based on the positional data, including actuating the plurality of indicating devices in a predetermined pattern indicative of a cone of uncertainty associated with a degree of uncertainty of a target location; and
    transmitting orientation data to the control system.

9. A computing system in accordance with claim 8, wherein the functions performed by the processor further comprise independently actuating each indicating device of the plurality of indicating devices based on the positional data.

10. A computing system in accordance with claim 8, wherein the functions performed by the processor further comprise actuating the plurality of indicating devices in the predetermined pattern based on the positional data, the predetermined pattern further indicative of at least one of a line of bearing towards the target location and a range of the target location.

11. A computing system in accordance with claim 8, wherein the functions performed by the processor further comprise generating at least one of a tactile signal and an auditory signal.

12. A computing system in accordance with claim 8, wherein the functions performed by the processor further comprise determining an orientation of the user.

13. A computing system in accordance with claim 8, wherein the functions performed by the processor further comprise determining a relative position for each indicating device of the plurality of indicating devices.

14. A system for selecting a target, said system comprising:
  an article configured to be worn by a user;
  a plurality of indicating devices coupled to the article; and
  a processing unit communicatively coupled to the plurality of indicating devices, wherein the processing unit is programmed to:
    receive positional data from a control system that is remote from the user;
    selectively actuate at least one indicating device of the plurality of indicating devices based on the positional data, including actuating the plurality of indicating devices in a predetermined pattern indicative of a cone of uncertainty associated with a degree of uncertainty of a target location; and
    transmit orientation data to the control system.

15. A system in accordance with claim 14, wherein the processing unit is further programmed to independently actuate each indicating device of the plurality of indicating devices based on the positional data.

16. A system in accordance with claim 14, wherein the processing unit is further programmed to actuate the plurality of indicating devices in the predetermined pattern based on the positional data, the predetermined pattern further indicative of at least one of a line of bearing towards the target location and a range of the target location.

17. A system in accordance with claim 14, wherein the at least one indicating device is configured to generate at least one of a tactile signal and an auditory signal.

18. A system in accordance with claim 14, wherein the processing unit is further programmed to determine an orientation of the user.

19. A system in accordance with claim 14, wherein the processing unit is programmed to determine a relative position for each indicating device of the plurality of indicating devices.

20. A system in accordance with claim 14, wherein the plurality of indicating devices are positioned in a plurality of predetermined locations.

* * * * *